(12) United States Patent
Moerke

(10) Patent No.: US 8,555,468 B2
(45) Date of Patent: Oct. 15, 2013

(54) ANTI-RATTLE CARRIER FOR MAGNET FASTENER

(75) Inventor: Benjamin H. Moerke, Chippewa Falls, WI (US)

(73) Assignee: Illinois Tool Works Inc., Glenview, IL (US)

( * ) Notice: Subject to any disclaimer, the term of this patent is extended or adjusted under 35 U.S.C. 154(b) by 399 days.

(21) Appl. No.: 12/362,631

(22) Filed: Jan. 30, 2009

(65) Prior Publication Data

US 2009/0211065 A1 Aug. 27, 2009

Related U.S. Application Data

(60) Provisional application No. 61/031,275, filed on Feb. 25, 2008.

(51) Int. Cl.
*B60R 13/02* (2006.01)
*H01F 7/00* (2006.01)

(52) U.S. Cl.
USPC ............... 24/303; 24/297; 24/293; 248/206.5

(58) Field of Classification Search
USPC .......... 24/303, 66.1, 297, 293, 294, 295, 457; 292/251.5; 248/206.5; 335/285; 403/74, 329
See application file for complete search history.

(56) References Cited

U.S. PATENT DOCUMENTS

| 3,009,225 | A | 11/1961 | Budreck | 24/201 |
| 7,306,190 | B2 | 12/2007 | Tisol, Jr. | |
| 7,435,031 | B2 * | 10/2008 | Granata | 403/74 |
| 7,640,639 | B2 * | 1/2010 | de Bien | 24/615 |
| 2002/0197107 | A1 | 12/2002 | Granata | 403/381 |
| 2004/0258471 | A1 * | 12/2004 | Granata | 403/381 |
| 2006/0127172 | A1 | 6/2006 | Tisol, Jr. | 403/410 |
| 2008/0184537 | A1 * | 8/2008 | Meckert et al. | 24/303 |

OTHER PUBLICATIONS

International Search Report and Written Opinion for PCT/US2009/032813.

* cited by examiner

*Primary Examiner* — Robert J Sandy
*Assistant Examiner* — Michael Lee
(74) *Attorney, Agent, or Firm* — Mark W. Croll; Paul F. Donovan

(57) ABSTRACT

A magnet fastener includes a carrier connectable to a first component and a magnet for attachment to a second, metal component. The carrier includes structures for holding a magnet assembly including the magnet in a manner that reduces rattle caused by vibration but provides flex so the magnet can articulate and adjust to a surface of the metal component.

16 Claims, 2 Drawing Sheets

ANTI-RATTLE CARRIER FOR MAGNET FASTENER

CROSS-REFERENCE TO RELATED APPLICATIONS

The present regular United States patent application claims the benefits of U.S. Provisional Application Ser. No. 61/031,275, filed on Feb. 25, 2008.

FIELD OF THE INVENTION

The present invention relates generally to blind fasteners adapted to secure one panel or structure to another panel or structure, and, more specifically to blind fasteners that employ magnets fastened to one structure and secured to a metal structure.

BACKGROUND OF THE INVENTION

Different types of fasteners are used in structures and assemblies to secure one panel or covering to another component of the structure or assembly. Fasteners of various types are particularly useful in automobile assemblies to secure headliners, interior panels, trim pieces and the like to roofs, door structures and other components. In some instances, one or more of the structures is relatively thin, and connecting a fastener thereto can be difficult, time-consuming or otherwise costly.

A problem with some known types of fasteners is that the fastener must be secured in a hole, slot, doghouse or other mating structure after the fastener has been secured to one of the components being connected together. Often, this results in a blind installation because the assembler is not able to view either the fastener or the mating structure in the component to which the fastener is being attached. To facilitate installation of fasteners in blind fastening situations, when one of the structures is a suitable metal, it is known to use magnetic fasteners, thereby eliminating the difficulty of a blind fastener application. The magnet is attached to one component of any material and will connect to a metal second component whenever the magnet fastener is brought in close proximity to the underlying metal structure. Known magnet fasteners are an assembly of a plastic base and a magnet assembly retained therein, with the plastic base secured to a nonmetallic component in typical fashion, such as by adhesive, and the magnet held to the metal component. With magnet fasteners, the assembler is not required to align a fastener with a mating hole and attach the fastener to the hole. The assembler need only bring the first component with the magnet fastener attached thereto into the desired final position relative to a metallic second component and the magnet fastener attaches thereto magnetically.

While magnetic fasteners of the type generally described have facilitated installations in many blind fastening situations, there is a continuing need for improved structures and arrangements for such fasteners. It is desirable for the fastener to have some yield or flexibility incorporated therein. During installation some fabric components can be moved, stretched or twisted inconsistently. Once installed, during use of an automobile, for example, the headliner is sometimes contacted or pushed by passengers. The components being connected together can have irregular or curved surfaces. Accordingly, it is desirable for the magnet to move as necessary to establish and maintain the magnet connection to the metallic component. However, since magnet fasteners can be used in vehicle interiors, for example, any rattling sound from vibration of the fastener can be objectionable. It is known to provide a compliant washer of foam or the like between the magnet assembly and the plastic base to minimize rattles. While such structures have been effective, the additional part of the foam washer adds cost to the fastener and can complicate assembly and installation of the fastener. Further, if the washer deteriorates over time the effectiveness in minimizing rattle is reduced.

SUMMARY OF THE INVENTION

The present invention provides a fastener having a carrier that attaches to a first structure and holds a magnet assembly for connection to a metallic structure. The carrier holds the magnet assembly in a non-rattling yet yielding position.

In one aspect of one form thereof, the present invention provides a fastener with a carrier having a receiver including a floor and a holder. A magnet assembly is disposed in the receiver and is held therein between the floor and a portion of the holder engaging a first side of the magnet assembly. A biasing element of the floor is engaged against a side of the magnet assembly opposite the first side.

In another aspect of another form thereof, the present invention provides a carrier for a magnet fastener, for retaining a magnet assembly, the carrier having a floor, a wall at least partly surround the floor at the perimeter thereof and a post extending from the floor. A deflectable portion of the post extends outwardly from the post. A biasing element of the floor is configured for biasing a magnet assembly toward the deflectable portion of the post.

In a still further aspect of a still further form thereof, the present invention provides a magnet fastener with a fastener carrier including a receiver having a floor, a wall at least partly surrounding the floor, and a post extending away from the floor. Securing mounts extend away from the receiver and are adapted for attaching the fastener carrier to a component. The post is hollow and defines openings therein. The post has outwardly angled tabs aligned with the openings, the tabs being deflectable toward the openings. A magnet assembly includes a cup disposed on the post and a magnet disposed in the cup, the cup having a bottom encircling the post between the floor and the tabs. Biasing elements of the floor urge the bottom of the cup against the tabs.

An advantage of the present invention in one form is providing a magnet fastener that includes a yielding magnet assemble to conform and align to a surface to which it connects.

Another advantage of the present invention in another form is providing a magnet fastener that facilitates blind connections and that is simple and easy to assemble and install.

A further advantage of the present invention in a further form is providing a magnet fastener that reduces relative vibration between parts thereof and minimizes rattle and sounds that could result from vibration.

Other features and advantages of the invention will become apparent to those skilled in the art upon review of the following detailed description, claims and drawings in which like numerals are used to designate like features.

Figure 1:
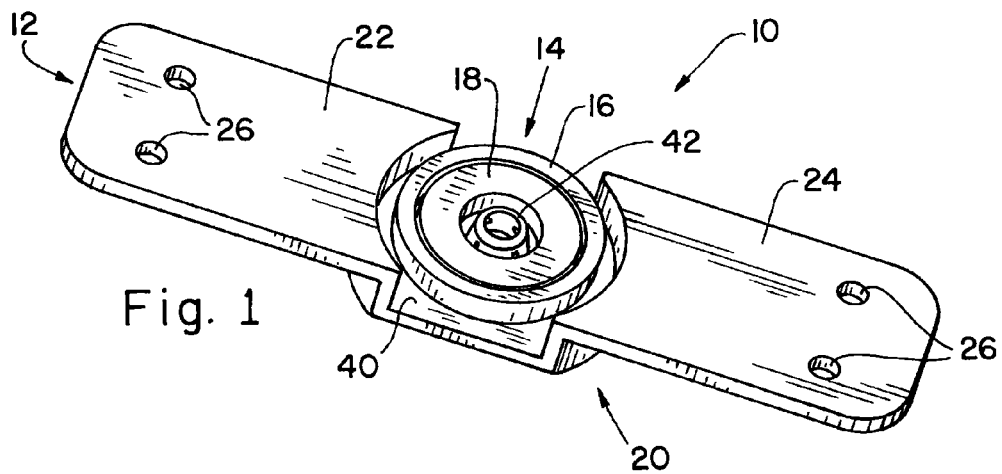
FIG. 1 is a perspective view of a magnet fastener having a magnet assembly retained by a carrier in accordance with the present invention.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Referring now more specifically to the drawings and to FIG. 1 in particular, numeral 10 designates a magnet fastener having a carrier 12 in accordance with the present invention. Fastener 10 further includes a magnet assembly 14 held by carrier 12, the magnet assembly having a cup 16 and a magnet 18 held in cup 16. Carrier 12 can be made of plastic by injection molding or other suitable processes. In a preferred embodiment, cup 16 is made of metal so that magnet 18 can be carried and retained therein without independent attachment means, although for added security adhesive can be used. Magnet assembly 14 is connected to carrier 12 by attaching structure on carrier 12 to be explained subsequently herein.

Figure 2:
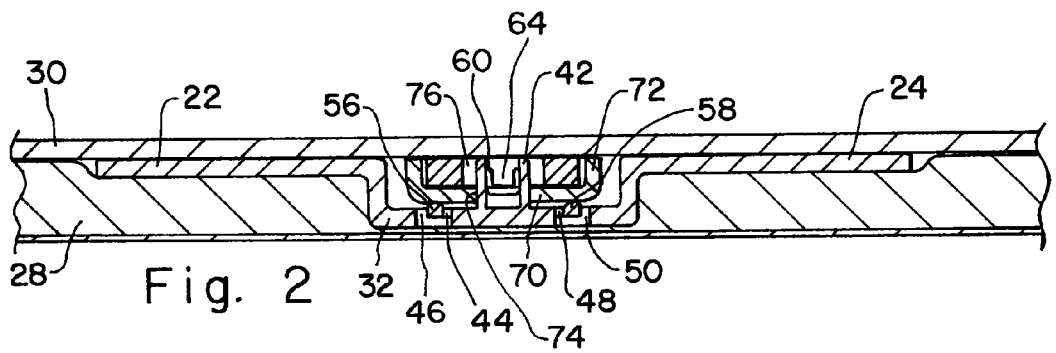
FIG. 2 is a cross sectional view of the fastener shown in FIG. 1, illustrating the fastener installed in an assembly of first and second components held by the fastener.

Carrier 12 includes a receiver 20 in which magnet assembly 14 is held and outwardly extending securing mounts 22, 24 by which carrier 12 can be attached to a component for which fastener 10 is to be used. In the exemplary embodiment shown, mounts 22, 24 are substantially rectangular extensions and may define holes or openings 26 for insertion of fasteners, or for receiving adhesive, or the like. By way of example and not limitation, FIG. 2 illustrates fastener 10 securing a first component 28, which may be an automobile headliner, for example, to a metallic second component 30, which may be an automobile roof. Securing mounts 22, 24 can be attached to the first component 28 by various methods, including, for example, gluing, welding, heat staking, pins or fasteners inserted through holes 26, or by an arrangement in which mounts 22, 24 are inserted into mating features or pockets (not shown) in the component. It should be understood that the principles of the present invention can be used in fasteners of other types and for many different purposes. Accordingly, the shape and construction of the securing mounts 22, 24 can be other than the rectangular panels shown. With fastener 10 physically attached or connected to first component 28, the first component is then held to second component 30 by magnet 18.

Figure 3:
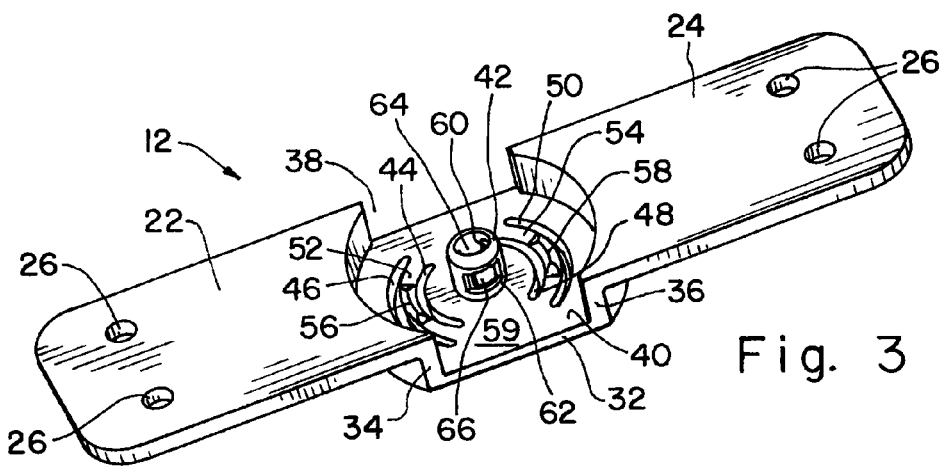
FIG. 3 is a perspective view of the carrier portion of the fastener shown in FIGS. 1 and 2.
Figure 4:
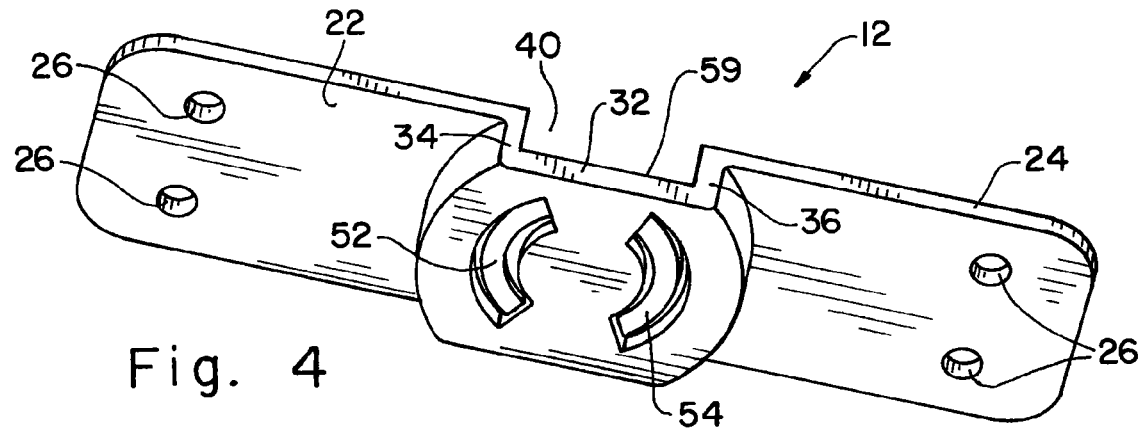
FIG. 4 is a perspective view of the bottom of the carrier.
Figure 5:
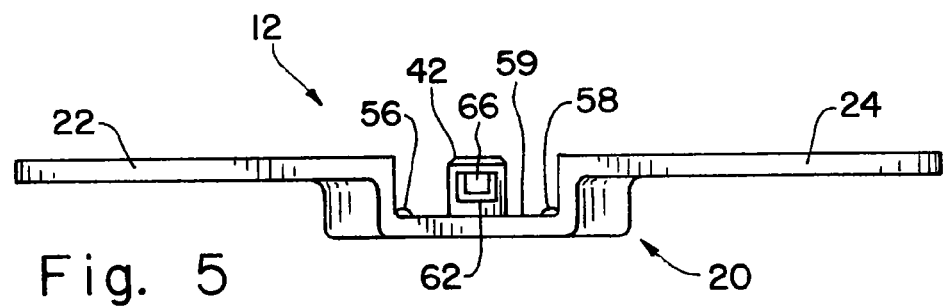
FIG. 5 is a side elevational view of the carrier.
Figure 6:
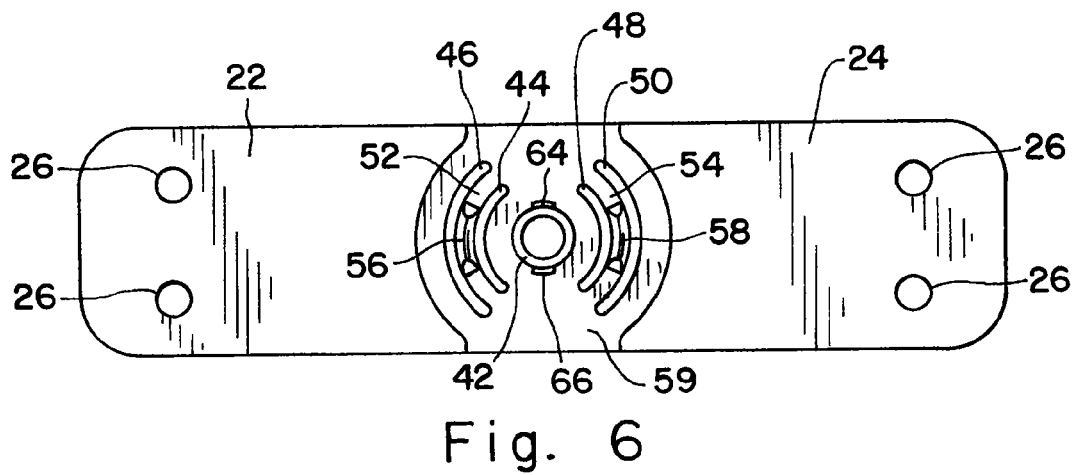
FIG. 6 is top plan view of the carrier.

Receiver 20 of the exemplary embodiment is a generally rounded structure, although other shapes and configurations also can be used. As seen most clearly in FIG. 3, receiver 20 includes a floor 32 and walls 34, 36. In the exemplary embodiment, walls 34, 36 are on opposite sides of floor 32 and define spaces 38, 40 there between on opposite ends. However, it should be understood that a single continuous wall around floor 32 also can be used, as well as more than two wall segments. Further, in some situations it may be advantageous to provide carrier 12 without mounts 22, 24 and without a sidewall around the floor. Floor 32 can be attached directly to the first component by other types of attaching structures or by adhesive or other bonding techniques including welding or the like. While the exemplary structure shown for floor 32 and walls 34, 36 define a generally circular structure flattened on opposite sides, other shapes and configurations also can be used.

Receiver 20 is provided with a holder 42 by which magnet assembly 14 is retained. In the exemplary embodiment, holder 42 is a post 42 extending from floor 32 substantially centrally located in receiver 20. Magnet assembly 14, of generally annular shape, is received on post 42 between walls 34, 36 and against floor 32.

Floor 32 defines a plurality of curved slots 44, 46, 48, 50 there through, and in the exemplary embodiment four slots 44, 46, 48, 50 are shown arranged in closely associated spaced pairs on opposite sides of post 42. Accordingly, slots 44, 46 define therebetween a relatively narrow, curved region of the floor forming a spring support 52 on one side of post 42; and slots 48, 50 define therebetween a relatively narrow, curved region of the floor forming a spring support 54 on an opposite side of post 42 from spring support 52. Protuberances 56, 58 on spring supports 52, 54, respectively, project above an inner surface 59 of floor 32. With the presence of protuberances 56, 58 spring supports 52, 54 are thicker than regions of floor 32 immediately adjacent spring supports 52, 54. Accordingly, spring supports 52, 54 are the areas of first contact by floor 32 against magnet assembly 14 during installation of magnet assembly 14 in receiver 20.

Post 42 is hollow and includes openings 60, 62 on diametrically opposite sides thereof. Deflectable tabs 64, 66 aligned with openings 60, 62, respectively, are united with the main cylindrical body of post 42 near the distal end of post 42. Tabs 64, 66 angle outwardly to form the widest portion of post 42 at the free ends of tabs 64, 66. Inwardly directed force against tabs 64, 66 can deflect the tabs inwardly in the openings 60, 62 to narrow the effective diameter of post 42. When inwardly directed force is relieved, tabs 64, 66 can rebound outwardly to again form a wider diameter of post 42.

Magnet assembly 14 includes both cup 16 and a magnet 18. Cup 16 is a circular structure having a bottom 70 and an annular sidewall 72. A hole 74 is defined in bottom 70. Hole 74 has a diameter sufficient to receive post 42 therein. The diameter of hole 74 is smaller than the maximum diameter of post 42 at the widest thereof, near the free ends of tabs 64, 66, when tabs 64, 66 are not deflected inwardly. The thickness of bottom 70 and the lengths and the positions of tabs 64, 66 are selected so that bottom 70 is held snuggly between the free ends of tabs 64, 66 which contact one surface of bottom 70, and protuberances 56, 58 which contact an opposite surface of bottom 70. Accordingly, once installed on post 42, cup 16 is restrained against axial movement along post 42. In one preferred arrangement, the distance between the free ends of tabs 64, 66 and a plane defined by the uppermost ridges of protuberances 56, 58 is somewhat less than the thickness of bottom 70 so that spring supports 52, 54 are pushed downwardly by magnet assembly 14 upon installation, and provide biasing force to urge magnet assembly 14 against the free ends of tabs 64, 66.

Magnet 18 is an annular or doughnut-like magnetic body of a size to fit within cup 16. Magnet 18 has a central hole 76 larger than hole 74, whereby tabs 64, 66 can freely fit therein and overlap bottom 70 adjacent hole 74.

Spring supports 52, 54 in a preferred arrangement are relatively long and narrow to provide sufficient flexibility so that uneven force exerted on magnet assembly 14 allows magnet assembly 14 to move angularly relative to receiver 20. The articulation of magnet assembly 14 relative to receiver 20 allows magnet assembly 14 to conform to and align with the surface of second component 32 to which it magnetically connects. Articulation of magnet assembly 14 relative to receiver 20 and post 42 is further facilitated by protuberances 56, 58 which hold bottom 70 spaced from the major expanse of surface 59 of floor 32. Cup 16 can tilt on protuberances 56, 58 with or without an additional deflection of spring supports 52, 54.

Carrier 12 of fastener 10 is secured to first component 28 by any suitable means, such as, for example, the aforementioned gluing, welding, heat staking, pins, fasteners, pocket-like receivers or the like (not shown) by placing base 20 against a substrate (not shown) of the headliner and attaching it with glue or the like.

Cup 16 is attached to carrier 12 by inserting the distal end of post 42 into central hole 74, and pushing bottom 70 of cup 16 along post 42 and over tabs 64, 66. Since hole 70 is of a narrower diameter than the widest diameter of post 42 as defined by tabs 64, 66, the edge of bottom 70 defining hole 74 engages the outer surface of tabs 64, 66. Continued force exerted on cup 16 to slide the cup axially along post 42 causes tabs 64, 66 to deflect inwardly in openings 60, 62 and allow bottom 70 to pass there over. Upon tabs 64, 66 passing through and emerging from hole 74, tabs 64, 66 rebound outwardly and overlap bottom 70 adjacent hole 74. Accordingly, cup 16 is locked in position on post 42, between the free ends of tabs 64, 66 and protuberances 56, 58 against which bottom 70 rests. Cup 16 can be attached to carrier 12 before or after carrier 12 is attached to the first component.

Magnet 18 is placed in cup 16, and if cup 16 is metal can be retained therein without adhesive. Magnet 18 can be placed within cup 16 at various times during the assembly process, either before carrier 12 is attached to first component 28, or at some time thereafter. Magnet 18 can be placed within cup 16 before or after cup 16 is connected to carrier 12.

Carrier 12 provides a flexible, yet snug connection between magnet assembly 14 and receiver 20. The snug fit of bottom 70 between spring supports 52, 54 and the free ends of tabs 64, 66 resists vibration and prevents rattle from occurring between the carrier and the magnet assembly. The flexibility provided by the narrow spring supports 52, 54, and the ability of cup 16 to tilt on post 42 enable magnet assembly 14 to articulate as necessary to accommodate angular variations in the surface of the second component to which it attaches.

It should be understood that the various components of the present invention can be provided in different shapes, sizes and configurations. The components shown and described as being round, annular or cylindrical can be of other shapes as well.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A fastener, comprising:
   a carrier having a receiver including a floor and a holder extending from said floor, said floor having an inner surface, an outer surface and a thickness defined therebetween, said floor further having an inner surface, an outer surface and a thickness defined therebetween, said floor further having a pair of closely spaced slots extending through said floor on one side of said holder, said pair of closely spaced slots defining therebetween a narrow region of said floor, said narrow region of said floor including an area thereof that is thicker than said thickness defined between said inner and outer surface of said floor that projects above adjacent regions of said floor, said narrow region of said floor being downwardly deflectable between said pair of closely spaced slots;
   a magnet assembly disposed in said receiver and held therein between said floor and a portion of said holder;
   said portion of said holder engaging a first surface of said magnet assembly; and
   said narrow region of said floor being engaged against an opposite surface of said magnet assembly.

2. The fastener of claim 1, said floor having a plurality of pairs of slots therein defining a plurality of narrow regions of said floor between adjacent ones of said slots.

3. The fastener of claim 2, said slots being curved.

4. The fastener of claim 3, each of said regions of said floor between adjacent slots having a protuberance thicker than other regions of said floor immediately adjacent thereto.

5. The fastener of claim 1, said holder being a post extending from said floor, said post having a deflectable tab angling outwardly therefrom.

6. The fastener of claim 5, said narrow region of said floor urging said magnet assembly against said tab.

7. The fastener of claim 6, said post having a plurality of tabs angling outwardly therefrom.

8. The fastener of claim 1, said narrow region of said floor urging said magnet assembly against said holder.

9. The fastener of claim 1, said carrier having a mount extending away from said receiver for attaching said carrier to a component.

10. A carrier for a magnet fastener, for retaining a magnet assembly, said carrier comprising:
    a floor having an inner surface and first and second pairs of closely spaced slots extending therethrough, each of said pairs of closely spaced slots defining in said floor therebetween a narrow region of said floor, each of said narrow regions of said floor including a protuberance projecting above said inner surface, and each being downwardly deflectable between said pair of closely spaced slots on opposite sides thereof, said narrow regions of said floor including said protuberance being thicker in a direction perpendicular to said floor;
    a wall at least partly surrounding said floor at the perimeter thereof;
    a post extending from said floor between said first and second pairs of slots on opposite sides of said post;
    at least one deflectable portion of said post extending outwardly therefrom; and
    said narrow region of said floor being configured for engagement against a side of a magnet assembly and further configured for biasing the magnet assembly toward said deflectable portion of said post.

11. The carrier of claim 10, said post being hollow and defining openings therein, and said post including outward angled deflectable tabs aligned with said openings.

12. The carrier of claim 10, said post being hollow and defining openings therein, and said post including outward angled deflectable tabs aligned with said openings.

13. The carrier of claim 10, including mounts for attaching said carrier to a component, said mounts extending away from said wall.

14. A magnet fastener, comprising:
- a fastener carrier including a receiver having a floor with an inner surface, a wall at least partly surrounding said floor, and a post extending away from said floor; and securing mounts extending away from said receiver adapted for attaching said fastener carrier to a component;
- said post being hollow and defining openings therein, said post having outwardly angled tabs aligned with said openings, said tabs being deflectable toward said openings;
- a magnet assembly including a cup disposed on said post and a magnet disposed in said cup, said cup having a bottom encircling said post between said floor and said tabs; and
- first and second narrow regions of said floor on opposite sides of said post, each of said narrow regions defined within said floor between different pairs of closely spaced slots extending through said floor, said narrow regions of said floor having a thicker portion in a direction perpendicular to said floor, and said narrow regions of said floor engaging said magnet assembly and urging said magnet assembly against said tabs.

15. The magnet fastener of claim 14, said cup being metal and said fastener carrier being plastic.

16. The magnet fastener of claim 14, said narrow regions of said floor between said slots of said pairs of slots having protuberances thereon, said protuberances supporting said bottom of said cup.

* * * * *